US012421863B2

(12) United States Patent
Breault et al.

(10) Patent No.: US 12,421,863 B2
(45) Date of Patent: Sep. 23, 2025

(54) TURBINE ENGINE TIP CLEARANCE CONTROL SYSTEM WITH THRUST BEARING

(71) Applicant: Raytheon Technologies Corporation, Farmington, CT (US)

(72) Inventors: Andrew E. Breault, Bolton, CT (US); Jeffrey T. Morton, Manchester, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/224,934

(22) Filed: Jul. 21, 2023

(65) Prior Publication Data

US 2025/0027423 A1 Jan. 23, 2025

(51) Int. Cl.
*F01D 11/14* (2006.01)
*F01D 25/16* (2006.01)

(52) U.S. Cl.
CPC .............. *F01D 11/14* (2013.01); *F01D 25/16* (2013.01); *F05D 2240/52* (2013.01)

(58) Field of Classification Search
CPC .......... F01D 11/14; F01D 11/16; F01D 11/20; F01D 11/22; F04D 27/002; F04D 29/051; F04D 29/0513; F05D 2240/52
See application file for complete search history.

(56) References Cited

U.S. PATENT DOCUMENTS 2,599,273 A 6/1952 Mitchell
2,613,501 A * 10/1952 Price .......................... F02C 7/08 60/39.83
2,622,789 A * 12/1952 Lundquist ................. F02C 3/08 417/409
4,276,002 A * 6/1981 Anderson ............... F04D 13/10 415/112

(Continued)

FOREIGN PATENT DOCUMENTS

CA 1221034 A 4/1987

OTHER PUBLICATIONS

EP Search Report for EP Patent Application No. 24189729.7 dated Dec. 18, 2024.

*Primary Examiner* — Courtney D Heinle
*Assistant Examiner* — Ryan C Clark
(74) *Attorney, Agent, or Firm* — Getz Balich LLC

(57) ABSTRACT

An assembly is provided for an aircraft powerplant. This assembly includes a rotating assembly, a first structure, a second structure and a thrust bearing. The rotating assembly includes a first bladed rotor and a second bladed rotor. The first bladed rotor includes a plurality of first rotor blades. The second bladed rotor includes a plurality of second rotor blades. The first structure is configured as or otherwise includes a first shroud. The first shroud circumscribes the first bladed rotor. The first shroud is adjacent first tips of the first rotor blades. The second structure is configured as or otherwise includes a second shroud. The second shroud (Continued)

circumscribes the second bladed rotor. The second shroud is adjacent second tips of the second rotor blades. The second shroud is configured to move along an axis relative to the first shroud. The thrust bearing couples the rotating assembly to the second structure.

15 Claims, 5 Drawing Sheets

(56) References Cited

U.S. PATENT DOCUMENTS

| | | | | | |
|---|---|---|---|---|---|
| 4,687,412 | A * | 8/1987 | Chamberlain | F04D 29/4206 | 415/173.1 |
| 5,211,541 | A * | 5/1993 | Fledderjohn | F01D 5/066 | 416/198 A |
| 5,263,816 | A * | 11/1993 | Weimer | F04D 29/052 | 415/173.1 |
| 5,658,125 | A * | 8/1997 | Burns | F04D 29/058 | 415/70 |
| 5,827,040 | A * | 10/1998 | Bosley | F16C 32/0692 | 417/407 |
| 7,824,151 | B2 | 11/2010 | Schwarz | | |
| 8,764,385 | B2 * | 7/2014 | Behaghel | F01D 9/065 | 415/131 |
| 10,260,348 | B2 | 4/2019 | Cracco | | |
| 10,962,024 | B2 | 3/2021 | Nesteroff | | |
| 10,989,061 | B2 * | 4/2021 | Milne | F01D 11/14 | |
| 11,002,284 | B2 | 5/2021 | Nesteroff | | |
| 2002/0071763 | A1 | 6/2002 | Brandl | | |
| 2006/0140756 | A1 | 6/2006 | Schwarz | | |
| 2008/0134659 | A1 * | 6/2008 | Schwarz | F04D 29/059 | 415/129 |
| 2008/0267769 | A1 | 10/2008 | Schwarz | | |
| 2020/0400034 | A1 | 12/2020 | Redford | | |

* cited by examiner

TURBINE ENGINE TIP CLEARANCE CONTROL SYSTEM WITH THRUST BEARING

BACKGROUND OF THE DISCLOSURE

1. Technical Field

This disclosure relates generally to a turbine engine and, more particularly, to a tip clearance control system for the turbine engine.

2. Background Information

A gas turbine engine may include a tip clearance control system to maintain a select clearance between blade tips of a rotor and an adjacent shroud. Various types and configurations of tip clearance control systems are known in the art. While these known tip clearance control systems have various benefits, there is still room in the art for improvement.

SUMMARY OF THE DISCLOSURE

According to an aspect of the present disclosure, an assembly is provided for an aircraft powerplant. This assembly includes a rotating assembly, a first structure, a second structure and a thrust bearing. The rotating assembly is rotatable about an axis. The rotating assembly includes a first bladed rotor and a second bladed rotor. The first bladed rotor includes a plurality of first rotor blades arranged circumferentially around the axis. The second bladed rotor includes a plurality of second rotor blades arranged circumferentially around the axis. The first structure is configured as or otherwise includes a first shroud. The first shroud circumscribes the first bladed rotor. The first shroud is adjacent first tips of the first rotor blades. The second structure is configured as or otherwise includes a second shroud. The second shroud circumscribes the second bladed rotor. The second shroud is adjacent second tips of the second rotor blades. The second shroud is configured to move along the axis relative to the first shroud. The thrust bearing couples the rotating assembly to the second structure.

According to another aspect of the present disclosure, another assembly is provided for an aircraft powerplant. This assembly includes a rotating assembly, a structure and a thrust bearing. The rotating assembly is rotatable about an axis and includes a bladed rotor. The bladed rotor includes a plurality of rotor blades arranged circumferentially around the axis. A structure includes a shroud and a vane array structure. The shroud circumscribes the bladed rotor. The shroud is adjacent tips of the rotor blades. An outer platform of the vane array structure is rigidly connected to an upstream end of the shroud. The thrust bearing couples the rotating assembly to the structure. The thrust bearing is rigidly connected to an inner platform of the vane array structure.

According to still another aspect of the present disclosure, another assembly is provided for an aircraft powerplant. This assembly includes a rotating assembly, a structure, a thrust bearing, a shaft and a second bearing. The rotating assembly is rotatable about an axis and includes a radial flow compressor rotor. The radial flow compressor rotor includes a plurality of compressor blades arranged circumferentially around the axis. The structure is configured as or otherwise includes a shroud. The shroud circumscribes the radial flow compressor rotor. The shroud is adjacent tips of the compressor blades. The thrust bearing couples the rotating assembly to the structure. The thrust bearing is configured to link axial movement of the radial flow compressor rotor along the axis with axial movement of the shroud along the axis. The shaft projects axially through a bore of the rotating assembly. The second bearing couples the shaft to the rotating assembly. The second bearing is axially aligned with the thrust bearing along the axis.

The vane array structure may include a plurality of vanes arranged circumferentially around the axis. Each of the vanes may be connected to and/or extend radially between the outer platform and the inner platform. The thrust bearing may be axially aligned with the vanes radially inboard of the inner platform.

The bladed rotor may be configured as or otherwise include a radial flow compressor rotor. The thrust bearing may be configured to link axial movement of the bladed rotor along the axis with axial movement of the shroud along the axis.

The first bladed rotor may be configured as or otherwise include an axial flow rotor.

The second bladed rotor may be configured as or otherwise include a radial flow rotor.

The assembly may also include a compressor section. The first bladed rotor and the second bladed rotor may be included in adjacent stages of the compressor section.

The first shroud and the second shroud may each form a respective portion of an outer peripheral boundary of a flowpath which extends across the first bladed rotor and the second bladed rotor. The second bladed rotor may be downstream of the first bladed rotor along the flowpath.

The first structure may axially interface with the second structure at a sliding joint.

The second structure may also include a vane array structure adjacent the second bladed rotor. An outer platform of the vane array structure may be rigidly connected to the second shroud. An inner platform of the vane array structure may be rigidly connected to the thrust bearing.

The assembly may also include a flex coupling flexibly coupling the first structure to the second structure.

An annular channel may project radially into the rotating assembly towards the axis. The thrust bearing may be arranged in the annular channel.

The thrust bearing may be arranged axially between and next to the first bladed rotor and the second bladed rotor.

The thrust bearing may be configured to synchronize axial movement of the second bladed rotor along the axis with axial movement of the second shroud along the axis.

The thrust bearing may be configured as or otherwise include a foil bearing.

The thrust bearing may be configured as or otherwise include a hydrodynamic bearing.

The thrust bearing may be configured as or otherwise include a hydrostatic bearing.

The thrust bearing may be configured as or otherwise include a journal bearing.

The thrust bearing may be configured as or otherwise include a rolling element bearing.

The assembly may also include a shaft and a second bearing. The shaft may be rotatable about the axis. The shaft may extend axially in a bore of the rotating assembly. The second bearing may be radially between and may couple the shaft and the rotating assembly. The second bearing may be axially aligned with the thrust bearing.

The assembly may also include an engine core and a flowpath. The engine core may include a compressor section, a combustor section and a turbine section. The flowpath may extend through the compressor section, the combustor section and the turbine section from an inlet into the flowpath to an exhaust from the flowpath. The flowpath may also extend across the first bladed rotor and the second bladed rotor.

The compressor section may include the first bladed rotor, the second bladed rotor, the first shroud and the second shroud.

The assembly may also include a mechanical load and a powerplant engine. The powerplant engine may be configured to power the mechanical load. The powerplant engine may include the rotating assembly, the first structure and the second structure.

The assembly may also include a power turbine section configured to drive rotation of a propulsor rotor. The mechanical load may be configured as or otherwise include the propulsor rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
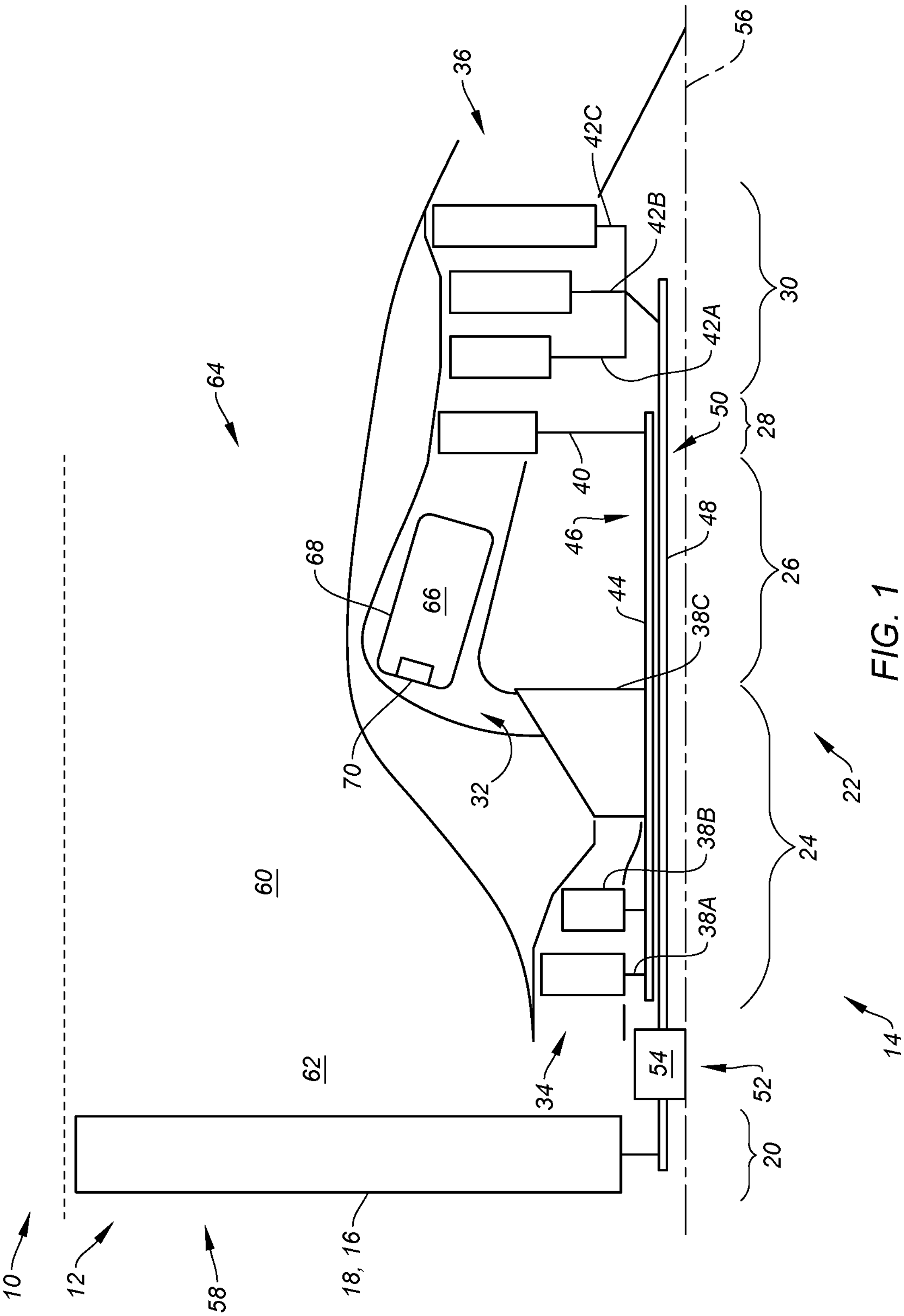
FIG. 1 is a partial schematic illustration of a powerplant for an aircraft.

FIG. 1 illustrates a powerplant 10 for an aircraft. The aircraft may be an airplane, a helicopter, a drone (e.g., an unmanned aerial vehicle (UAV)) or any other manned or unmanned aerial vehicle or system. The powerplant 10 may be configured as, or otherwise included as part of, a propulsion system for the aircraft. The powerplant 10 may also or alternatively be configured as, or otherwise included as part of, an electrical power system for the aircraft. The powerplant 10 of FIG. 1 includes a mechanical load 12 and a powerplant engine 14 (e.g., a gas turbine engine) configured to power the mechanical load 12.

The mechanical load 12 of FIG. 1 includes at least one driven rotor 16. This driven rotor 16 may be configured as a bladed propulsor rotor for the aircraft propulsion system. The propulsor rotor may be a ducted propulsor rotor or an open propulsor rotor; e.g., an un-ducted propulsor rotor. An example of the ducted propulsor rotor is a fan rotor 18 for a ducted propulsion system; e.g., a turbofan propulsion system. Examples of the open propulsor rotor include a propeller rotor for a propeller propulsion system (e.g., a turboprop propulsion system), a rotorcraft rotor (e.g., a main helicopter rotor) for a rotorcraft propulsion system (e.g., a turboshaft propulsion system), a pusher fan rotor for a pusher fan propulsion system, and a propfan rotor for a propfan propulsion system. Alternatively, the driven rotor 16 may be configured as a generator rotor of an electric power generator for the aircraft electrical power system; e.g., an auxiliary power unit (APU) system. However, for ease of description, the mechanical load 12 is described below as a fan section 20 of the powerplant engine 14 and the driven rotor 16 is described below as the fan rotor 18 within the fan section 20.

The powerplant engine 14 of FIG. 1 includes a turbine engine core 22; e.g., a gas generator. This engine core 22 includes a core compressor section 24, a core combustor section 26 and a core turbine section 28. The powerplant engine 14 of FIG. 1 also includes a power turbine (PT) section 30 and a core flowpath 32; e.g., annular core flowpath. Here, the core turbine section 28 is configured as a high pressure turbine (HPT) section of the powerplant engine 14, and the PT section 30 is configured as a low pressure turbine (LPT) section of the powerplant engine 14. The core flowpath 32 extends sequentially through the core compressor section 24, the core combustor section 26, the core turbine section 28 and the PT section 30 from an airflow inlet 34 into the core flowpath 32 to a combustion products exhaust 36 from the core flowpath 32.

The core compressor section 24 includes one or more bladed compressor rotors 38A-C (generally referred to as "38"). The first and the second stage compressor rotors 38A and 38B of FIG. 1 are each configured as an axial flow compressor rotor. The third stage (e.g., final stage) compressor rotor 38C of FIG. 1 is configured as a radial flow compressor rotor. Each of these compressor rotors 38 includes a rotor base (e.g., a disk or a hub) and a plurality of compressor blades (e.g., compressor airfoils, compressor vanes, etc.) arranged circumferentially around and connected to the respective rotor base. The compressor rotors 38 are disposed in and arranged longitudinally along the core flowpath 32 between the core inlet 34 and the core combustor section 26. The compressor blades, for example, are disposed in and extend across the core flowpath 32. Each rotor base is disposed adjacent (e.g., radially below) the core flowpath 32. The present disclosure, however, is not limited to the foregoing exemplary core compressor section arrangement. For example, while the core compressor section 24 is shown in FIG. 1 with three stages, the core compressor section 24 may alternatively include a single one of the stages (e.g., the third stage compressor rotor 38C), two of the stages or more than three stages. In another example, while the compressor rotors 38A and 38B are shown as axial flow compressor rotors, any one or more of the compressor rotors 38A, 38B may alternatively be configured as a radial flow compressor rotor.

The core turbine section 28 includes a blade high pressure turbine (HPT) rotor 40. The HPT rotor 40 of FIG. 1 is configured as an axial flow turbine rotor. The HPT rotor 40 includes a rotor base (e.g., a disk or a hub) and a plurality of turbine blades (e.g., turbine airfoils, turbine vanes, etc.) arranged circumferentially around and connected to the rotor base. The HPT rotor 40 is disposed in and arranged longitudinally along the core flowpath 32 between the core combustor section 26 and the PT section 30. The turbine blades, for example, are disposed in and extend across the core flowpath 32. The rotor base is disposed adjacent (e.g., radially below) the core flowpath 32. The present disclosure, however, is not limited to the foregoing exemplary core turbine section arrangement. For example, while the core turbine section 28 is shown in FIG. 1 with a single stage, the core turbine section 28 may alternatively include multiple stages. Moreover, while the HPT rotor 40 is shown as an axial flow turbine rotor, the HPT rotor 40 may alternatively be configured as a radial flow turbine rotor.

The PT section 30 includes one or more bladed power turbine (PT) rotors 42A-42C (generally referred to as "42"). The first, the second and the third stage PT rotors 42 of FIG. 1 are each configured as an axial flow turbine rotor. Each of these PT rotors 42 includes a rotor base (e.g., a disk or a hub) and a plurality of turbine blades (e.g., turbine airfoils, turbine vanes, etc.) arranged circumferentially around and connected to the respective rotor base. The PT rotors 42 are disposed in and arranged longitudinally along the core flowpath 32 between the core turbine section 28 and the core exhaust 36. The turbine blades, for example, are disposed in and extend across the core flowpath 32. Each rotor disk or hub is disposed adjacent (e.g., radially below) the core flowpath 32. The present disclosure, however, is not limited to the foregoing exemplary PT section arrangement. For example, while the PT section 30 is shown in FIG. 1 with three stages, the PT section 30 may alternatively include a single one of the stages, two of the stages or more than three stages. Moreover, while the PT rotors 42 are shown as axial flow turbine rotors, any one or more of the PT rotors 42 may alternatively be configured as a radial flow turbine rotor.

The compressor rotors 38 are coupled to and rotatable with the HPT rotor 40. The compressor rotors 38 of FIG. 1, for example, are connected to the HPT rotor 40 by a high speed shaft 44. At least (or only) the compressor rotors 38, the HPT rotor 40 and the high speed shaft 44 collectively form a high speed rotating assembly 46; e.g., a high speed spool. The PT rotors 42 are connected to a low speed shaft 48. At least (or only) the PT rotors 42 and the low speed shaft 48 collectively form a low speed rotating assembly 50. This low speed rotating assembly 50 is further coupled to the fan rotor 18 (the driven rotor 16) through a drivetrain 52. This drivetrain 52 may be configured as a geared drivetrain, where a geartrain 54 (e.g., a transmission, a speed change device, an epicyclic geartrain, etc.) is disposed between and operatively couples the fan rotor 18 to the low speed rotating assembly 50 and its PT rotors 42. With this arrangement, the fan rotor 18 may rotate at a different (e.g., slower) rotational velocity than the low speed rotating assembly 50 and its PT rotors 42. However, the drivetrain 52 may alternatively be configured as a direct drive drivetrain, where the geartrain 54 is omitted. With this arrangement, the fan rotor 18 rotates at a common (the same) rotational velocity as the low speed rotating assembly 50 and its PT rotors 42. Referring again to FIG. 1, each of the rotating assemblies 46, 50 and its members may be rotatable about a respective rotational axis. In particular, the rotating assemblies 46 and 50 of FIG. 1 rotate about a common rotational axis 56, which rotational axis 56 may also be an axial centerline of the engine core 22 and, more generally, the powerplant engine 14.

During operation of the powerplant 10 of FIG. 1, air enters the powerplant 10 through an airflow inlet 58 into the powerplant 10. This air is directed through the fan section 20 and into the core flowpath 32 and a bypass flowpath 60; e.g., annular bypass flowpath. The air within the core flowpath 32 may be referred to as "core air". The bypass flowpath 60 extends through a bypass duct and bypasses (e.g., is radially outboard of and extends along) the engine core 22, from an airflow inlet 62 into the bypass flowpath 60 to an airflow exhaust 64 from the bypass flowpath 60. The air within the bypass flowpath 60 may be referred to as "bypass air". Briefly, the core inlet 34 and the bypass inlet 62 may each be fluidly coupled with, adjacent and downstream of the fan section 20. The airflow inlet 58, the core exhaust 36 and the bypass exhaust 64 may each be fluidly coupled (e.g., independently, directly) with an environment external to the powerplant 10; e.g., an external environment outside of the aircraft.

The core air is compressed by the compressor rotors 38 and directed into a combustion chamber 66 (e.g., an annular combustion chamber) of a combustor 68 (e.g., an annular combustor) in the core combustor section 26. Fuel is injected into the combustion chamber 66 by one or more fuel injectors 70 and mixed with the compressed core air to provide a fuel-air mixture. This fuel-air mixture is ignited and combustion products thereof flow through and sequentially cause the HPT rotor 40 and the PT rotors 42 to rotate. The rotation of the HPT rotor 40 drives rotation of the compressor rotors 38 and, thus, compression of the air received from the core inlet 34. The rotation of the PT rotors 42 drives rotation of the fan rotor 18 (the driven rotor 16), which propels the bypass air through and out of the bypass flowpath 60. The propulsion of the bypass air may account for a majority of thrust generated by the aircraft propulsion system. Of course, where the mechanical load 12 also or alternatively includes the generator rotor, the rotation of the PT rotors 42 may drive the electric power generator to generate electricity.

Figure 2:
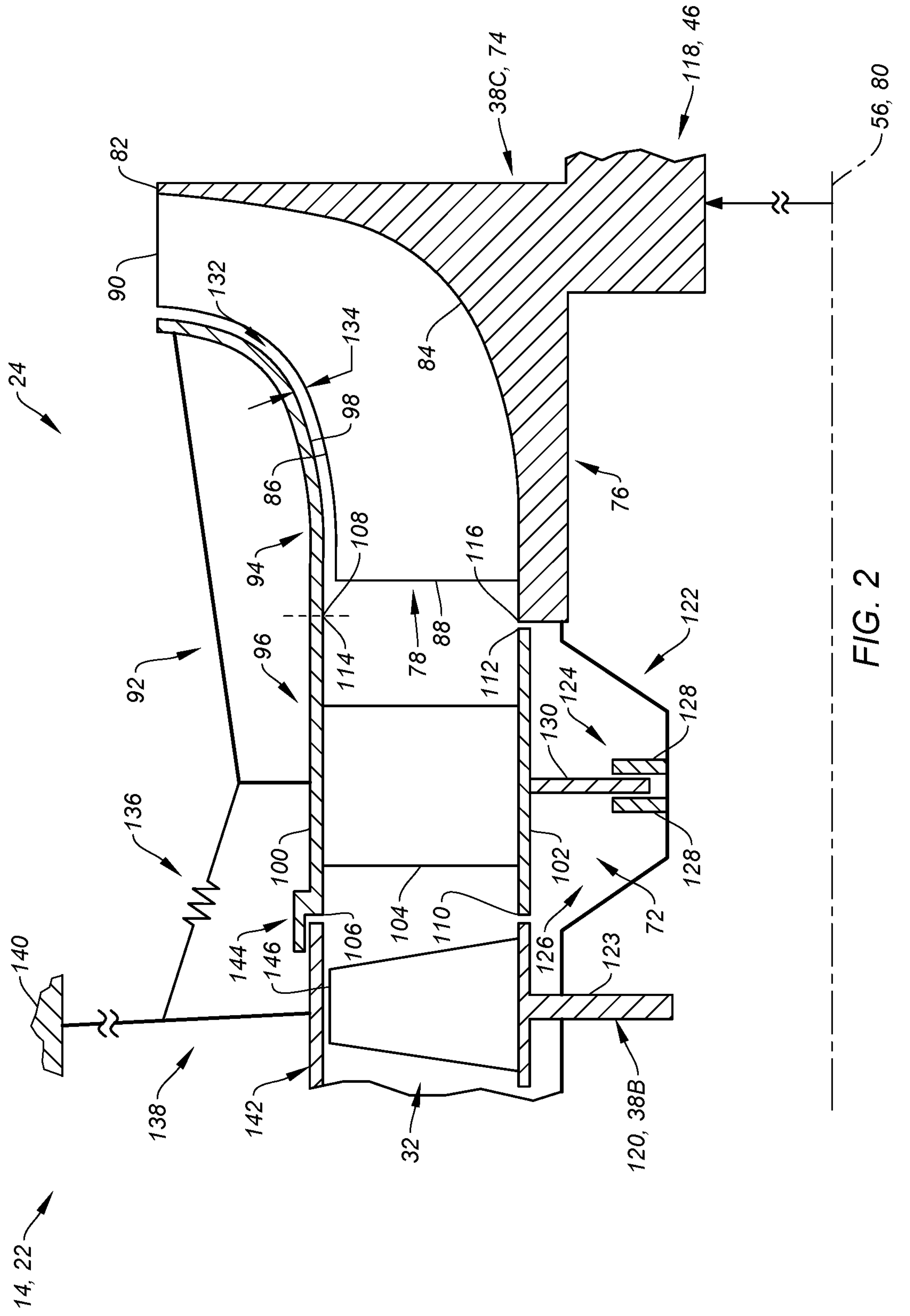
FIG. 2 is a partial schematic illustration of a compressor section of the powerplant with a tip clearance control system.

Referring to FIG. 2, the powerplant 10 includes a (e.g., passive) tip clearance control system 72 for a bladed engine rotor 74 within the powerplant engine 14. For ease of description, the engine rotor 74 is generally described below as the third stage compressor rotor 38C. It is contemplated, however, the engine rotor 74 may alternatively be configured as, or otherwise include, another bladed rotor within the powerplant engine 14.

Figure 3:
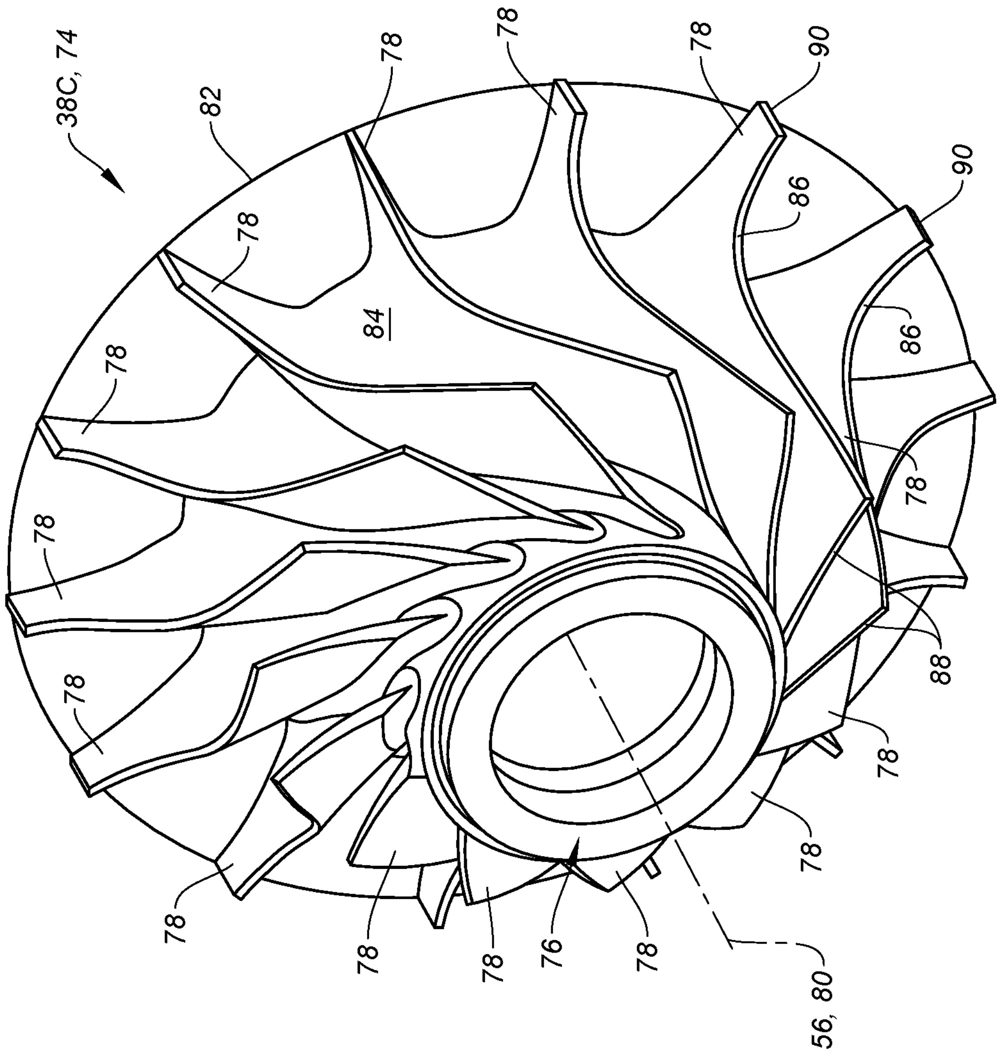
FIG. 3 is a perspective illustration of a bladed engine rotor.

Referring to FIG. 3, the engine rotor 74 may be configured as or otherwise include a radial flow rotor. The engine rotor 74 of FIG. 3, for example, is configured as a radial flow compressor rotor; e.g., an axial inflow-radial outflow compressor rotor, a compressor impeller rotor, etc. This engine rotor 74 includes an engine rotor base 76 (e.g., a hub, a disk, etc.) and a plurality of engine rotor blades 78 (e.g., vanes, airfoil, etc.).

Referring to FIG. 2, the rotor base 76 extends axially along an engine rotor axis 80; e.g., the rotational axis 56 of the high speed rotating assembly 46 of FIG. 1, an axial centerline of the engine rotor 74, etc. The rotor base 76 projects radially (in a radial outward direction away from the rotor axis 80) to a radial outer side 82 of the engine rotor 74 and its rotor base 76. The rotor base 76 forms a platform with an inner flowpath surface 84. This inner flowpath surface 84 may have a curved (e.g., arcuate, quarter circular, splined, etc.) sectional geometry when viewed, for example, in an axial reference plane parallel with (e.g., including) the rotor axis 80. With this arrangement, the rotor base 76 projects radially (in the radial outward direction) and axially to the inner flowpath surface 84.

Referring to FIG. 3, the rotor blades 78 are arranged circumferentially around the rotor axis 80 and the rotor base 76 in an annular array; e.g., a circular array. Each of the rotor blades 78 is connected (e.g., formed integral with or mechanically fastened, welded, brazed and/or otherwise attached to) the rotor base 76. Referring to FIG. 2, each rotor blade 78 projects axially out from the rotor base 76 and its inner flowpath surface 84 along the rotor axis 80 to a tip 86 of the respective rotor blade 78 and an axial end 88 of the respective rotor blade 78. Each rotor blade 78 projects radially out from the rotor base 76 and its inner flowpath surface 84 (in the radial outward direction) to its blade tip 86 and a radial end 90 of the respective rotor blade 78. The blade tip 86 projects radially inwards towards the rotor axis

80 from the blade radial end 90, and the blade tip 86 projects axially along the rotor axis 80 to the blade axial end 88. The blade axial end 88 forms a leading edge of the respective rotor blade 78. The blade radial end 90 forms a trailing edge of the respective rotor blade 78. Referring to FIG. 3, each rotor blade has a pressure side (e.g., a concave side) and a suction side (e.g., a convex side).

Referring again to FIG. 2, the engine rotor 74 is housed within a stationary structure 92 (e.g., a non-rotating structure) of the powerplant engine 14 and its engine core 22. This stationary structure 92 includes an outer shroud 94 (e.g., a blade outer air seal (BOAS)) and a vane array structure 96.

The outer shroud 94 is arranged next to and outboard of the engine rotor 74. The outer shroud 94 of FIG. 2, for example, is disposed radially and/or axially adjacent the blade tips 86. This outer shroud 94 extends circumferentially around the engine rotor 74, thereby circumscribing the rotor blades 78 and their blade tips 86. The outer shroud 94 forms an outer flowpath surface 98 opposite the inner flowpath surface 84. This outer flowpath surface 98 may have a curved (e.g., arcuate, quarter circular, splined, etc.) sectional geometry when viewed, for example, in the axial reference plane. With this arrangement, a portion of the core flowpath 32 within the core compressor section 24 extends longitudinally across the engine rotor 74 and its rotor blades 78, and is bounded (e.g., radially and/or axially) between the inner flowpath surface 84 and the outer flowpath surface 98. The outer shroud 94 thereby forms an outer flowpath wall along the core flowpath 32 within the core compressor section 24.

The vane array structure 96 includes a radial outer platform 100, a radial inner platform 102 and a plurality of stator vanes 104; e.g., guide vanes, aerodynamic struts, etc. The outer platform 100 extends axially along the axis 56, 80 between and to an upstream end 106 of the outer platform 100 and a downstream end 108 of the outer platform 100. The inner platform 102 is disposed radially inboard of the outer platform 100. This inner platform 102 extends axially along the axis 56, 80 between and to an upstream end 110 of the inner platform 102 and a downstream end 112 of the inner platform 102. Each of these structure platforms 100, 102 extends (e.g., completely) circumferentially around the axis 56, 80, providing each respective structure platform 100, 102 with a full-hoop (e.g., tubular) body. The outer platform 100 of FIG. 2 forms an outer peripheral boundary of the core flowpath 32 through the vane array structure 96. The inner platform 102 of FIG. 2 forms an inner peripheral boundary of the core flowpath 32 through the vane array structure 96. The stator vanes 104 are arranged circumferentially about the axis 56, 80 in an array; e.g., a circular array. Each of the stator vanes 104 extends radially across the core flowpath 32 from the inner platform 102 to the outer platform 100. Each of these stator vanes 104 is rigidly connected to (e.g., directly fixed to, formed integral with, etc.) the outer platform 100 and the inner platform 102.

The vane array structure 96 is arranged next to (e.g., axial adjacent, and upstream of) the outer shroud 94 and the engine rotor 74 along the core flowpath 32. The outer platform 100 is (e.g., directly) rigidly connected to the outer shroud 94. For example, the outer platform 100 of FIG. 2 at (e.g., on, adjacent or proximate) its downstream end 108 is fixed to (e.g., mechanically fastened to, bonded to or formed integral with) the outer shroud 94 at an upstream end 114 of the outer shroud 94. The inner platform downstream end 112 of FIG. 2 is arranged next to (e.g., slightly axially spaced from) an upstream end 116 of the engine rotor 74 and its rotor base 76.

The inner platform 102 is disposed radially outboard of and circumscribes an engine rotating assembly 118 (e.g., the high speed rotating assembly 46) of the powerplant engine 14 and its engine core 22. The engine rotating assembly 118 of FIG. 2 includes the engine rotor 74, another bladed neighboring engine rotor 120 and a rotor linkage 122; e.g., an annular coupler or a tubular shaft.

The neighboring engine rotor 120 may be in an adjacent stage of the powerplant engine 14 to the stage of the engine rotor 74. For example, where the engine rotor 74 is the third stage compressor rotor 38C, the neighboring engine rotor 120 may be the second stage compressor rotor 38B. In the embodiment of FIG. 2, the neighboring engine rotor 120 is longitudinally upstream of the engine rotor 74 along the core flowpath 32. It is contemplated, however, the neighboring engine rotor 120 may alternatively be arranged longitudinally downstream of the engine rotor 74 along the core flowpath 32.

The rotor linkage 122 rotatably couples the engine rotor 74 to the neighboring engine rotor 120. The rotor linkage 122 of FIG. 2, for example, extends axially along the axis 56, 80 between and to the engine rotor 74 and its rotor base 76 and the neighboring engine rotor 120 and its rotor base 123. This rotor linkage 122 is also fixedly connected to the engine rotor 74 and its rotor base 76 and the neighboring engine rotor 120 and its rotor base 123.

The engine rotating assembly 118 is rotatably coupled to the stationary structure 92 through a thrust bearing 124; e.g., an axial bearing. This thrust bearing 124 may be configured as or otherwise include an axial foil bearing or any other axial hydrodynamic bearing. Alternatively, the thrust bearing 124 may be configured as or otherwise include an axial hydrostatic bearing, an axial journal bearing or an axial rolling element bearing (e.g., ball bearing).

The thrust bearing 124 of FIG. 2 is arranged axially along the axis 56, 80 between the engine rotor 74 and the neighboring engine rotor 120. This thrust bearing 124 is axially aligned with the vane array structure 96. The vane array structure 96 of FIG. 2, for example, is radially outboard of and axially overlaps the thrust bearing 124. More particularly, the inner platform 102 is radially outboard of and axially overlaps the thrust bearing 124. The thrust bearing 124 may also be arranged in an annular channel 126 of the engine rotating assembly 118. This annular channel 126 projects radially into the engine rotating assembly 118 and its rotor linkage 122 towards the axis 56, 80.

The thrust bearing 124 of FIG. 2 includes one or more bearing rotors 128 and a bearing stator 130. The thrust bearing 124 is rigidly connected to the engine rotating assembly 118 and its rotor linkage 122. The bearing rotors 128 of FIG. 2, for example, are mounted on and fixed to (e.g., mechanically fastened to, bonded to, etc.) the rotor linkage 122. Here, the bearing rotors 128 are disposed at a bottom (e.g., radial inner side) of the annular channel 126. The thrust bearing 124 is rigidly connected to the stationary structure 92 and its vane array structure 96. The bearing stator 130 of FIG. 2, for example, is fixed to (e.g., mechanically fastened to, bonded to, etc.) the inner platform 102.

Efficiency of the core compressor section 24 and the powerplant engine 14 in general may be affected by clearance between the engine rotor 74 and the outer shroud 94. A clearance gap 132, for example, is provided between the engine rotor 74 and the outer shroud 94. This clearance gap 132 has a height 134 which extends radially and/or axially from the blade tips 86 to the outer flowpath surface 98. The clearance gap 132 and its height 134 may be sized large enough to prevent (or significantly reduce likelihood of)

rubbing between each blade tip 86 and the outer shroud 94 and its outer flowpath surface 98. However, as the clearance gap 132 and its height 134 increase, core air leakage across the blade tip 86 also increases. Increasing core air leakage across the blade tips 86 reduces a volume of the core air compressed by the engine rotor 74. Increasing core air leakage across the blade tips 86 may also increase boundary layer turbulence along the outer flowpath surface 98. Thus, as core air leakage across the blade tips 86 increases, compressor section efficiency decreases. Therefore, the clearance gap 132 and its height 134 are typically sized large enough to prevent (or significantly reduce likelihood of) rubbing between the blade tips 86 and the outer shroud 94 and its outer flowpath surface 98, while small enough to minimize core air leakage across the blade tips 86.

Thermal expansion and contraction of the engine rotating assembly 118 may cause the engine rotor 74 to move (e.g., slightly shift) axially along the axis 56, 80. If left unmitigated, such axial movement of the engine rotor 74 may lead to a size change in the clearance gap 132 and its height 134. Where the size change is an increase in the clearance gap 132 and its height 134, additional core air may leak across the blade tips 86. Where the size change is a decrease in the clearance gap 132 and its height 134, there may be a risk of blade tip rub against the outer shroud 94.

The tip clearance control system 72 of FIG. 2 is provided to account for, inter alia, axial movement (e.g., shifting) of the engine rotor 74 along the axis 56, 80. More particularly, the tip clearance control system 72 is configured to control (e.g., maintain) the clearance between the engine rotor 74 and the outer shroud 94. The tip clearance control system 72 of FIG. 2, for example, includes the stationary structure 92 and the thrust bearing 124. This tip clearance control system 72 of FIG. 2 also includes a flex coupling 136.

The flex coupling 136 flexibly couples the stationary structure 92 of the tip clearance control system 72 to a neighboring stationary structure 138 of the powerplant engine 14, which neighboring stationary structure 138 may be rigidly or otherwise fixedly coupled to an engine case 140. With this arrangement, the stationary structure 92 is operable to move (e.g., slightly shift) axially along the axis 56, 80 relative to the neighboring stationary structure 138 and, thus, the engine case 140. For example, the stationary structure 92 and its outer platform 100 may meet (e.g., axially interface with) a neighboring outer shroud 142 (e.g., a blade outer air seal (BOAS)) of the neighboring stationary structure 138 at a compliant joint 144 such as an axial sliding joint; e.g., a slip joint, a telescoping joint, etc. The outer platform 100 and, thus, the outer shroud 94 may thereby be operable to move (e.g., translate, slide, etc.) axially relative to the neighboring outer shroud 142 along the axis 56, 80. Briefly, the neighboring outer shroud 142 is arranged (e.g., radially) next to and outboard of the neighboring engine rotor 120. The neighboring outer shroud 142 of FIG. 2, for example, is disposed radially and/or axially adjacent blade tips 146 of the neighboring engine rotor 120. The neighboring outer shroud 142 extends circumferentially around the neighboring engine rotor 120.

During operation of the powerplant engine 14, thermal expansion or contraction of the engine rotating assembly 118 may cause the engine rotor 74 to slightly shift axially to the right in FIG. 2. During such an axial shift, the thrust bearing 124 may push the stationary structure 92 and its outer shroud 94 also axially to the right. The tip clearance control system 72 may thereby (e.g., substantially) maintain the clearance between the engine rotor 74 and the outer shroud 94. Similarly, thermal expansion or contraction of the engine rotating assembly 118 may cause the engine rotor 74 to slightly shift axially to the left in FIG. 2. During such an axial shift, the thrust bearing 124 may push the stationary structure 92 and its outer shroud 94 also axially to the left. The tip clearance control system 72 may thereby (e.g., substantially) maintain the clearance between the engine rotor 74 and the outer shroud 94. The thrust bearing 124 may thereby synchronize axial movement of the engine rotor 74 along the axis 56, 80 with axial movement of the outer shroud 94 along the axis 56, 80 to maintain the clearance between the engine rotor 74 and the outer shroud 94.

Figure 4:
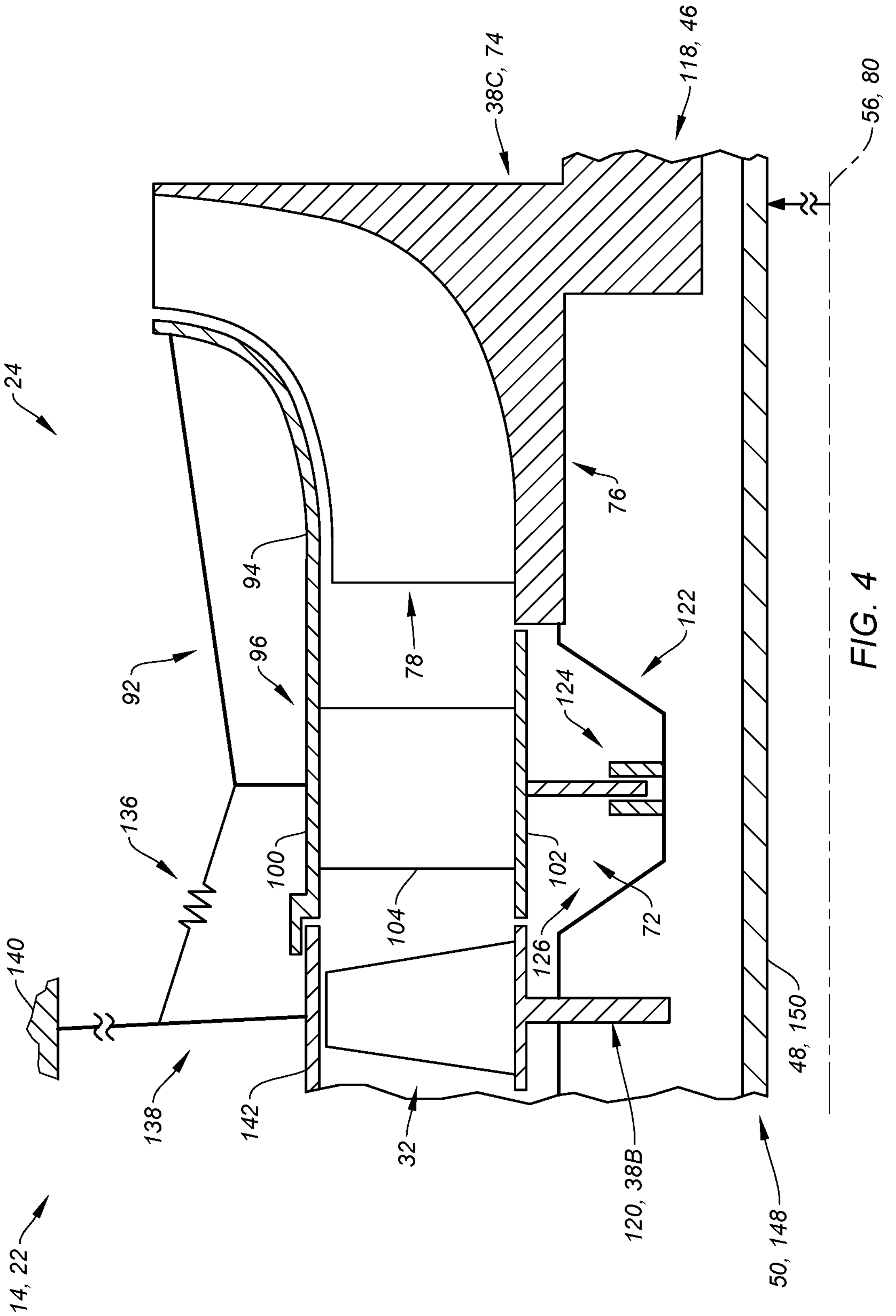
FIGS. 4 and 5 are partial schematic illustrations of the compressor section with various arrangements between its nested rotating assemblies.
Figure 5:
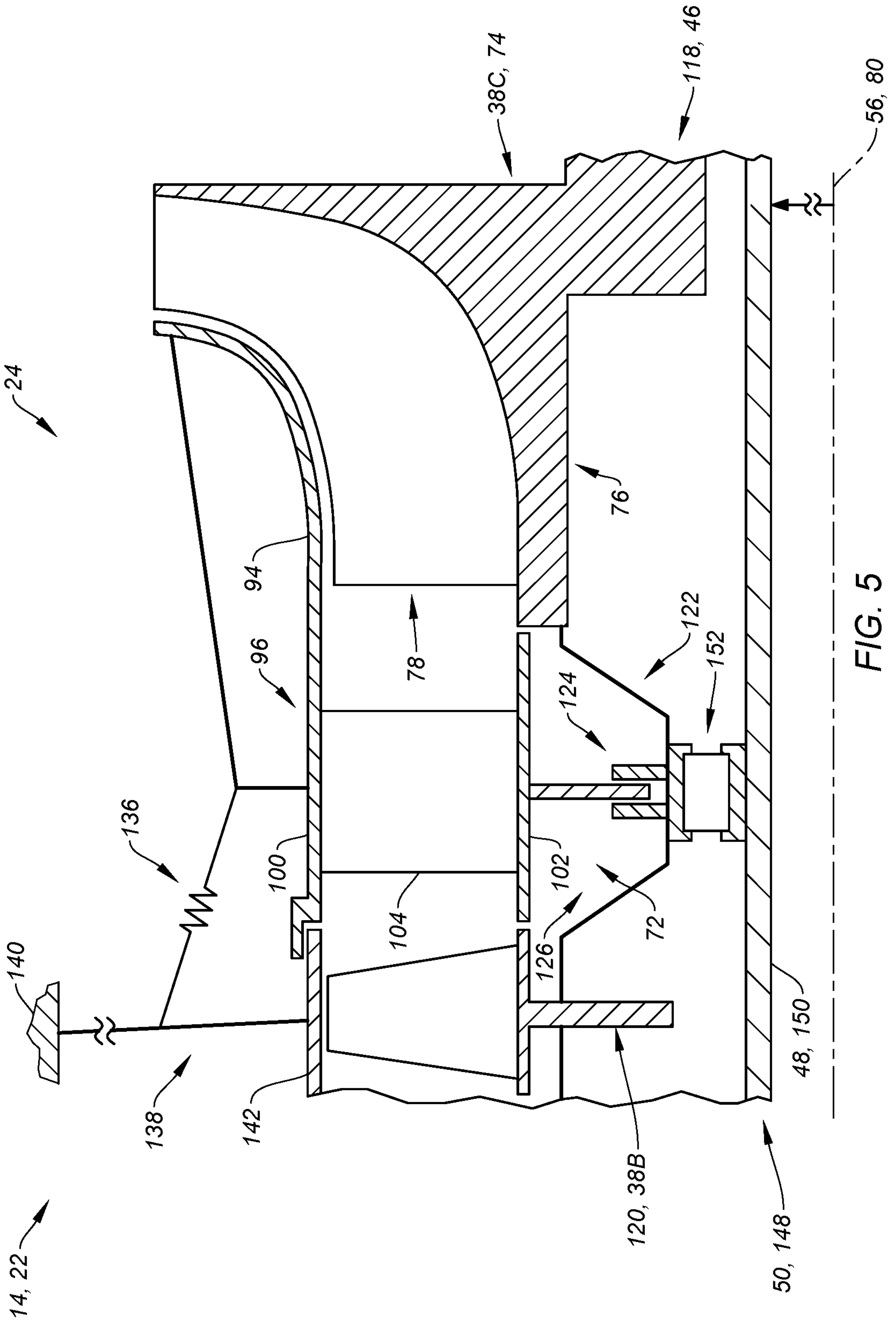

Referring to FIGS. 4 and 5, another engine rotating assembly 148 (e.g., the low speed rotating assembly 50) may be nested with the engine rotating assembly 118. An engine shaft 150 (e.g., the low speed shaft 48) of the other engine rotating assembly 148 of FIGS. 4 and 5, for example, extends axially through (or at least partially into) a central bore of the engine rotating assembly 118. In some embodiments, referring to FIG. 4, the engine rotating assemblies 118 and 148 may be structurally decoupled at and about an axial location of the thrust bearing 124 along the axis 56, 80. In other embodiments, referring to FIG. 5, the engine rotating assemblies 118 and 148 may be structurally coupled at or about the axial location of the thrust bearing 124. A radial bearing 152 (e.g., a rolling element bearing), for example, may be arranged radially between and may rotatably couple the engine rotating assemblies 118 and 148. This radial bearing 152 of FIG. 5 may be axially aligned with the thrust bearing 124. The engine shaft 150 may thereby structurally support the engine rotating assembly 118 at the axial location of the thrust bearing 124 through the radial bearing 152. Provision of the radial bearing 152 may reduce or prevent possible deformation of the engine rotating assembly 118 and, in particular, its rotor linkage 122 at a U-shaped portion of its sidewall forming the annular channel 126. Of course, it is contemplated in other embodiments, the rotor linkage 122 may also or alternatively be configured without the annular channel 126 to provide additional structural rigidity between the engine rotors 74 and 120.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft powerplant, comprising:

a rotating assembly rotatable about an axis, the rotating assembly including a first bladed rotor and a second bladed rotor, the first bladed rotor including a plurality of first rotor blades arranged circumferentially around the axis, and the second bladed rotor including a plurality of second rotor blades arranged circumferentially around the axis;

a first structure comprising a first shroud, the first shroud circumscribing the first bladed rotor, and the first shroud adjacent first tips of the plurality of first rotor blades;

a second structure comprising a second shroud, the second shroud circumscribing the second bladed rotor, the second shroud adjacent second tips of the plurality of second rotor blades, and the second shroud configured to move along the axis relative to the first shroud;

a thrust bearing coupling the rotating assembly to the second structure;

a shaft rotatable about the axis, the shaft extending axially in a bore of the rotating assembly; and a second bearing radially between and coupling the shaft and the rotating assembly, the second bearing axially aligned with the thrust bearing.

2. The assembly of claim 1, wherein the first bladed rotor comprises an axial flow rotor.

3. The assembly of claim 1, wherein the second bladed rotor comprises a radial flow rotor.

4. The assembly of claim 1, further comprising:

a compressor section;

the first bladed rotor and the second bladed rotor included in adjacent stages of the compressor section.

5. The assembly of claim 1, wherein the first shroud and the second shroud each form a respective portion of an outer peripheral boundary of a flowpath which extends across the first bladed rotor and the second bladed rotor; and the second bladed rotor is downstream of the first bladed rotor along the flowpath.

6. The assembly of claim 1, wherein the first structure axially interfaces with the second structure at a sliding joint.

7. The assembly of claim 1, wherein the second structure further comprises a vane array structure adjacent the second bladed rotor;

an outer platform of the vane array structure is rigidly connected to the second shroud; and an inner platform of the vane array structure is rigidly connected to the thrust bearing.

8. The assembly of claim 1, further comprising a flex coupling flexibly coupling the first structure to the second structure.

9. The assembly of claim 1, wherein an annular channel projects radially into the rotating assembly towards the axis; and the thrust bearing is arranged in the annular channel.

10. The assembly of claim 1, wherein the thrust bearing is arranged axially between and next to the first bladed rotor and the second bladed rotor.

11. The assembly of claim 1, wherein the thrust bearing is configured to synchronize axial movement of the second bladed rotor along the axis with axial movement of the second shroud along the axis.

12. The assembly of claim 1, wherein the thrust bearing comprises a foil bearing.

13. The assembly of claim 1, further comprising:

an engine core including a compressor section, a combustor section and a turbine section; and a flowpath extending through the compressor section, the combustor section and the turbine section from an inlet into the flowpath to an exhaust from the flowpath, and the flowpath further extending across the first bladed rotor and the second bladed rotor.

14. The assembly of claim 1, further comprising:

a mechanical load; and a powerplant engine configured to power the mechanical load, the powerplant engine including the rotating assembly, the first structure and the second structure.

15. The assembly of claim 14, further comprising:

a power turbine section configured to drive rotation of a propulsor rotor;

the mechanical load comprising the propulsor rotor.

* * * * *